US006231762B1

(12) United States Patent
Marshall, III

(10) Patent No.: US 6,231,762 B1
(45) Date of Patent: May 15, 2001

(54) FILTRATION SYSTEM FOR SEPTIC SYSTEM

(75) Inventor: J. Griffith Marshall, III, Sherwood, OR (US)

(73) Assignee: Bowco Industries Inc., Portland, OR (US)

( * ) Notice: Subject to any disclaimer, the term of this patent is extended or adjusted under 35 U.S.C. 154(b) by 0 days.

(21) Appl. No.: 09/494,967

(22) Filed: Jan. 31, 2000

(51) Int. Cl.$^7$ ................................................ B01D 29/33
(52) U.S. Cl. .................. 210/234; 210/235; 210/256; 210/299; 210/303; 210/429; 210/437; 210/532.2
(58) Field of Search .................. 210/234, 235, 210/256, 299, 303, 308, 429, 435, 441, 459, 532.2, 437, 457

(56) References Cited

U.S. PATENT DOCUMENTS

| 399,173 | * | 3/1889 | Von Zandt | 210/235 |
|---|---|---|---|---|
| 2,591,248 | * | 4/1952 | Francois | 210/234 |
| 3,037,636 | * | 6/1962 | McFarlin | 210/429 |
| 3,272,337 | * | 9/1966 | Elwell | 210/234 |
| 3,327,858 | * | 6/1967 | Eddy et al. | 210/234 |
| 3,909,415 | * | 9/1975 | Young | 210/234 |
| 4,832,846 | * | 5/1989 | Gavin | 210/532.2 |
| 5,382,357 | | 1/1995 | Nurse . | |
| 5,481,621 | | 1/1996 | Nurse . | |
| 5,580,453 | | 12/1996 | Nurse, Jr. . | |
| 5,683,577 | | 11/1997 | Nurse, Jr. . | |
| 5,871,640 | * | 2/1999 | Gavin | 210/429 |
| 6,015,488 | * | 1/2000 | Gavin | 210/234 |

FOREIGN PATENT DOCUMENTS

29668 * 11/1963 (CH) .
1036771 * 8/1958 (DE) .

OTHER PUBLICATIONS

Product literature or advertisement, Polylok™ "Often Imitated, Never Duplicated" PL–122 Effluent Filter System.
Product literature or advertisement, Tuf–Tite® Multi–Pass ™ Effluent Filter.
Product literature or advertisement, Zabel Envoronmental Technologies™ A1800s.
Product literature or advertisement, "Septic Tank Effluent Filter ... On Site" 170–0023 & 170–0058 Residential Septic Tank Effluent Filter, ©1998 Zoeller Co.
Product literature or advertisement, '4 Biotube® Effluent Filter & Biotube Jr.' Orenco Systems Incorporated, ©Apr. 1, 1999.

* cited by examiner

Primary Examiner—Christopher Upton
(74) Attorney, Agent, or Firm—Bennet K. Langlotz; Bennet K. Langlotz, P.C.

(57) ABSTRACT

A wastewater filtration system with a housing provided by a cylindrical conduit forming a filter chamber and having an inlet end and an outlet. A shutoff valve assembly is connected to an inlet end of the housing, and includes a closure element movable between an open position and a closed position. The closure element is biased to the closed position in the absence of a filter in the chamber and positioned near the inlet such that the shutoff valve opens when a filter is installed. The closure element may be hinged to the housing, and may be counterweighted or spring biased to the closed position.

20 Claims, 4 Drawing Sheets

FILTRATION SYSTEM FOR SEPTIC SYSTEM

FIELD OF THE INVENTION

The invention relates to waste treatment, and more particularly to effluent filters for septic systems.

BACKGROUND AND SUMMARY OF THE INVENTION

A household sewage treatment system not using a municipal sewer typically employs a septic tank and drain field. Household waste is discharged into the septic tank, where solids are allowed to settle, so that liquids may flow to a drain field of perforated conduits that permit the liquid to seep into the ground. To prevent the drain field system from being clogged by solid material that may escape the septic tank, a perforated filter normally is connected between the tank and the field. Such filters generally reside in the tank, in an outlet pipe leading to the drain field. Filters are generally removable, to allow their occasional replacement or cleaning prior to becoming clogged.

When a filter is not periodically replaced or cleaned, it eventually becomes significantly or fully clogged, waste flow into the septic tank exceeds the outflow rate, causing the tank to overfill. The homeowner becomes aware of this by the failure of waste drains to drain at an adequate rate, or at all. In this condition, the filter should be replaced to allow liquids to depart the septic tank. However, a homeowner seeking relief from the inadequate drainage problem may ill-advisedly remove the filter without replacing it, permitting solids to enter and clog the drain field. Such clogging can necessitate an expensive restoration of the drain field, including removing and replacing surface landscaping.

Even in circumstances in which a replacement filter is available, the replacement process may be messy, or allow some solid material to reach the drain field. When a clogged filter is removed, fluid pressure may cause the fluid to overflow the filter housing, or to carry solids to the drain field before a replacement is installed.

An existing system that addresses these issues is PL-122 effluent filter system from Polylok, Inc, of Yalesville, Conn. This system has a floating ball captured in a molded filter housing. When no filter is installed, the ball floats against a seat to close or restrict the housing inlet. When the filter is installed, it pushes the ball down from the seat, allowing flow through the filter. This system has certain disadvantages. First, the filter housing is relatively complex, requiring production by a molding process that limits the housing to use with only one size of filter. While filters may come in different sizes for different applications, many will not fit into a given molded design. Too-long filters will not be fully installable, and too-short filters will not actuate the ball float to permit fluid flow. In addition, this system is susceptible to premature clogging by rising solids that may float up from the bottom of the tank, caused by decomposition gasses buoying the solids. When these solids enter the unprotected inlets of the system, they may lead to premature clogging of the filter. In addition, molded housings are bulky to ship and stock and costly to produce.

The embodiment disclosed herein overcomes these disadvantages by providing a wastewater filtration system with a housing provided by a cylindrical conduit forming a filter chamber and having an inlet end and an outlet. A shutoff valve assembly is connected to an inlet end of the housing, and includes a closure element movable between an open position and a closed position. The closure element is biased to the closed position in the absence of a filter in the chamber and positioned near the inlet such that the shutoff valve opens when a filter is installed. The closure element may be hinged to the housing, and may be counterweighted or spring biased to the closed position.

DETAILED DESCRIPTION OF A PREFERRED EMBODIMENT

Figure 1:
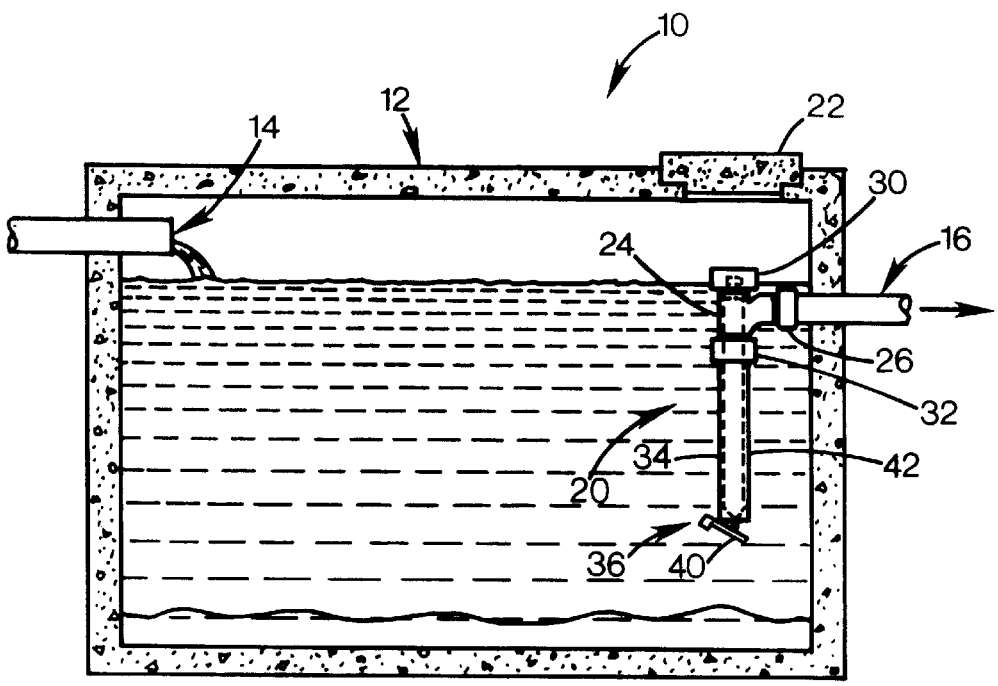
FIG. 1 is a sectional side view of a septic tank including a filter system according to a preferred embodiment of the invention.
Figure 2:
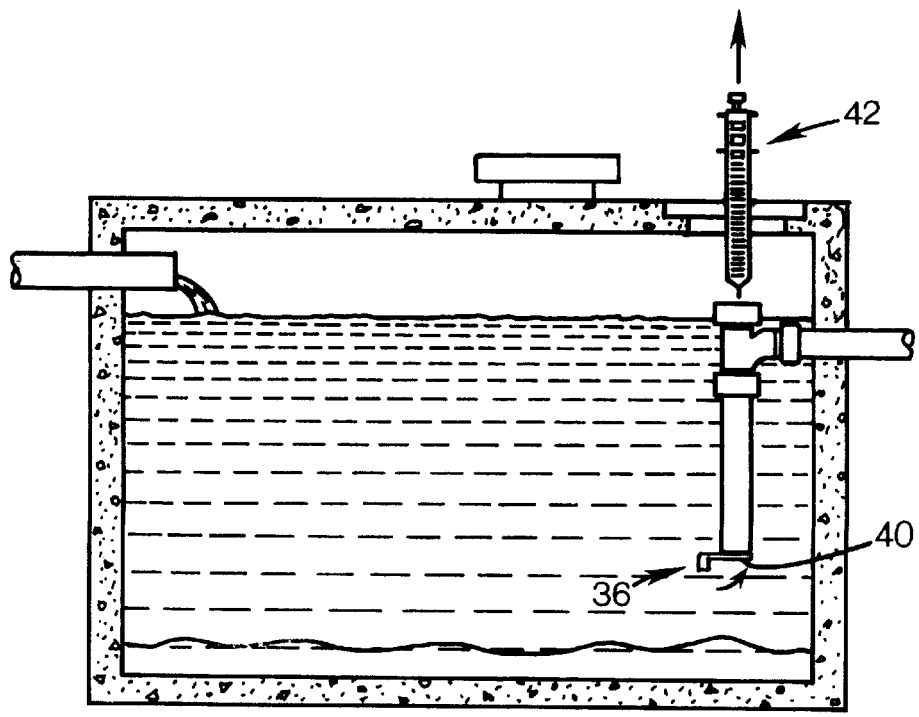
FIG. 2 is a sectional side view of the system of FIG. 1 with the filter removed.

FIGS. 1 and 2 show a septic system 10 with a septic tank 12 having a waste inlet pipe 14, a fluid waste outlet pipe 16 leading to a drain field, and a filter system 20 connected to the outlet pipe and contained within the tank. An removable access lid 22 covers an access aperture directly above the filter assembly 20, allowing for filter removal and replacement.

The filter assembly includes a conventional sanitary tee fitting 24 with its branch aperture 26 connected to the outlet pipe 16, its top inlet 30 pointed up toward the access aperture, and its discharge 32 pointed downward, with a length of conventional drain pipe or conduit 34 extending from the discharge. The conventional terminology for the openings of the tee are used, although the flow through the fitting in the preferred embodiment differs from that indicated by the terms.

A shutoff valve assembly 36 is connected to the lower end of the conduit 34, and includes a flapper plate 40 movable between an open position as shown in FIG. 1, and a closed position as shown in FIG. 2. The flapper is normally biased to the closed position. However, in FIG. 1, a filter cartridge 42 is installed in the conduit, so that the lower end of the filter forces the flapper open, as will be discussed in detail with respect to FIG. 3. In FIG. 2, the filter 42 is withdrawn for replacement, allowing the flapper to return to the closed position. Consequently, when the filter is installed, fluid may flow from the tank via the outlet pipe; when the filter is removed, the flapper largely shuts off outflow to prevent escape of solids, and to ensure that a replacement filter is installed before the system is used.

Figure 3:
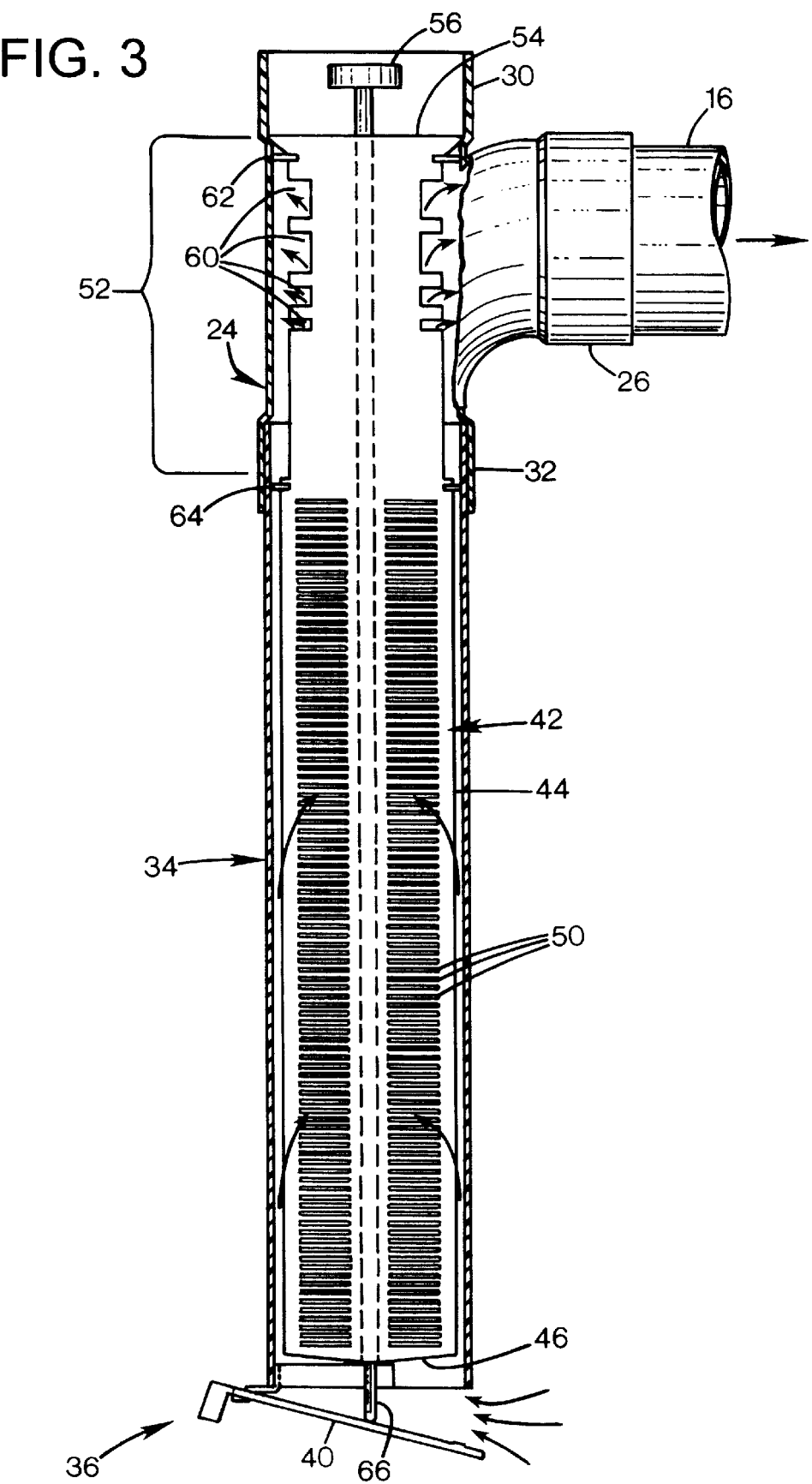
FIG. 3 is a detailed sectional side view of the system of FIG. 1.

As shown in FIG. 3, the filter 42 defines an elongated chamber, with an elongated lower inlet portion 44 closely received in the conduit 34. The lower portion has a closed bottom panel 46 and sidewalls populated with a multitude of perforations or slots 50 that are sized to block entry of solids, but which have a large total free area to permit substantial fluid flow needed for a given system. A contiguous upper portion 52 has a closed top panel 54 from which a handle 56 protrudes, and has sidewalls with large fluid outlet apertures 60. The upper portion is received within the main portion of the tee 24, and has upper and lower gaskets 62, 64 that seal against the interior of the tee above and below the outlet apertures 60. The upper and lower seals ensure that unfiltered waste does not bypass the filter apertures 50 or enter the tee from above. The top panel of the filter is flared to a larger diameter than the nominal interior diameter of the tee, so that it closely fits within the interior of the top inlet 30, and provides a stop to prevent over insertion of the filter beyond the proper position shown. In operation, fluid enters the filter chamber via the slots 50, flows upward within the filter chamber, and exits the filter via the apertures 60.

Figure 4:
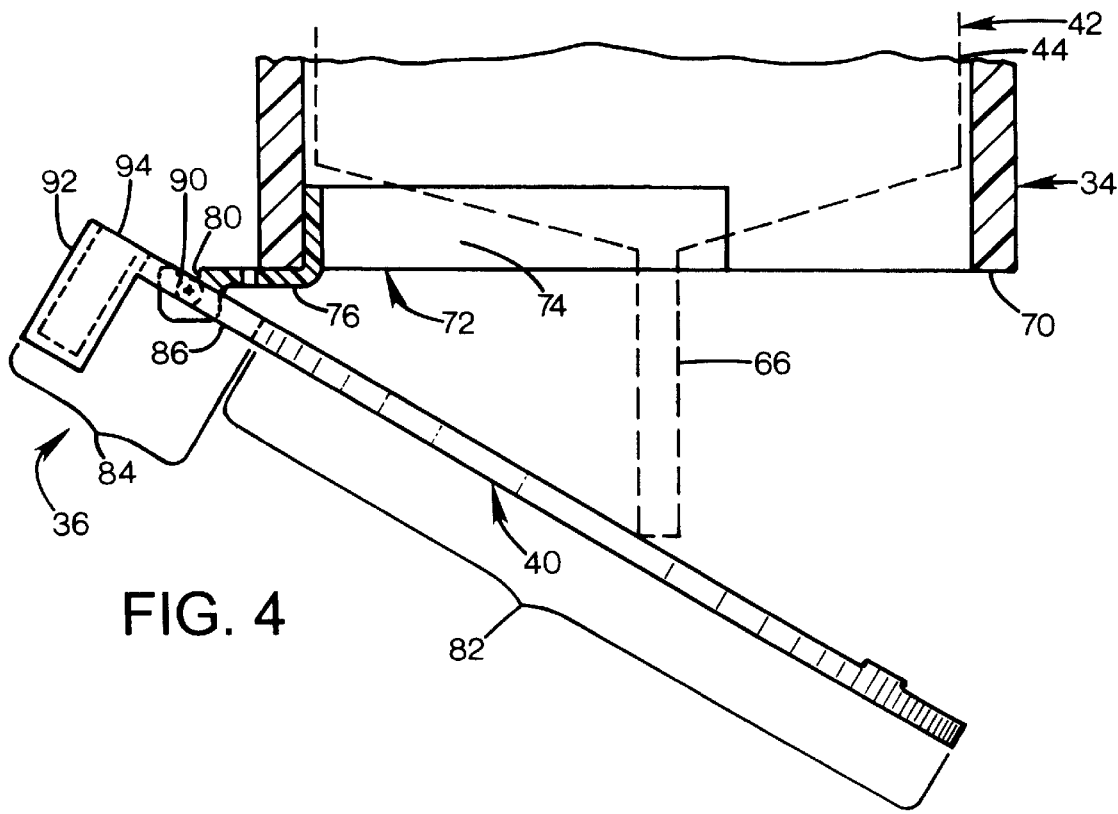
FIGS. 4 and 5 are sectional side views of the shutoff valve assembly of the system of FIG. 1.

As shown in FIG. 4, the filter 42 has a central protrusion 66 that extends downward along the axis of the conduit 34, beyond the lower end face 70 of the conduit. This forces the shutoff valve to the open position shown in FIGS. 1 and 4. The valve assembly 36 includes a fixed chassis 72, with the flapper plate 40 pivotally attached to the chassis. The chassis includes a semi-cylindrical base strip 74 that is adhered to the interior surface of the conduit, flush with the lower end face 70. A hinge support portion 76 extends radially outward from a middle portion of the strip, passing under the face 70, and extending slightly beyond the outer surface of the conduit, where it terminates in a hinge pin slot 80 defining a pivot axis. The side walls 44 of the filter terminate a moderate distance above the upper edge of the base strip, so that the height of the strip does not limit filter insertion, or block passage of waste upwardly within the gap between the filter exterior and the conduit interior.

The flapper plate 40 is a circular panel 82 having a diameter somewhat larger than that of the conduit 34, so that it entirely underlays the end face 70 of the conduit when in the closed position shown in FIG. 5, and so that it blocks substantially all of the interior of the conduit from below against floating debris that might otherwise rise into the conduit and prematurely clog the filter. A hinge portion 84 includes a pair of spaced apart arms 86 with a hinge pin 90 spanning between the arms and received in the hinge pin slot 80. A counterweight 92 is connected to the opposite ends of the arms 86. The counterweight has a mass adequate to provide a greater moment than provided by the plate, even with the limited lever arm desired to provide a compact package. In addition, the counterweight must have sufficient density in excess of water so that it is not buoyed by the water in which it resides. If the panel 82 has buoyancy, less counterweight mass will be required than if the panel is not buoyant. In the preferred embodiment, the counterweight is provided by a stainless steel weight 94 inserted or insert molded into a injection molded part formed of polypropylene or other rigid thermoplastic material. Because polypropylene is buoyant with respect to water, this or other buoyant material may be used in the absence of a spring or counterweight to provide a buoyant force to bias the valve closed. Similarly, a hollow structure of dense material may have a net buoyancy for the same effect.

Figure 5:
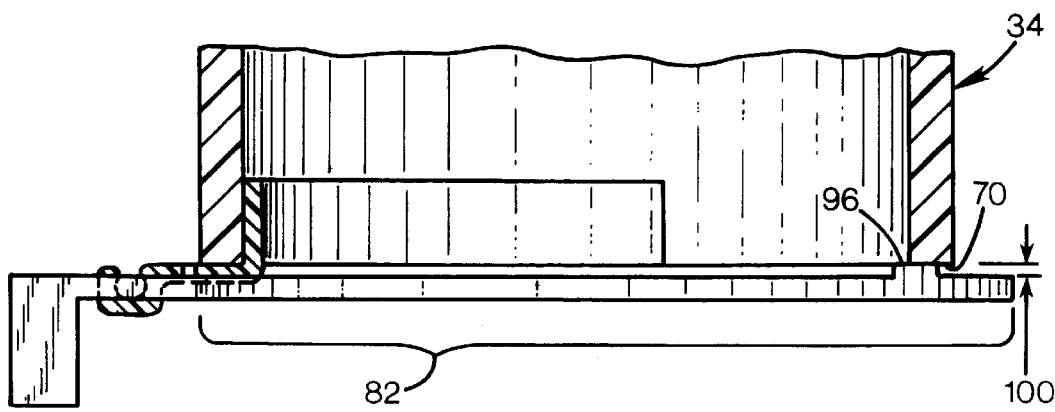

As shown in FIG. 5, the upper surface of the panel 82 has an elevated boss 96 that contacts the end face 70 of the conduit 34 to provide a narrow gap 100. The geometry of the hinge also ensures that the hinge end of the plate is similarly spaced apart so that the gap is even about the entire periphery of the plate. The gap provides limited fluid flow, and essentially serves as a filter to prevent passage of solids. This permits gradual limited draining of an overfilled septic tank, such as might occur if a clogged filter prevents fluid from escaping. The gradual flow may allow backed-up household drains to drain slightly, and may allow minimal emergency drain usage before a new filter is installed. In the closed position, the panel 82 entirely covers the conduit opening, and will prevent large solids from entering the conduit where they may prematurely clog the filter.

Figure 6:
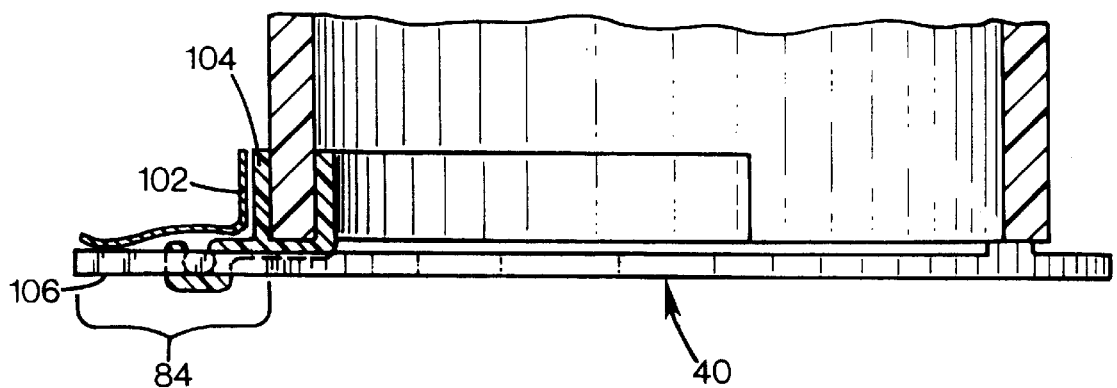
FIG. 6 is a sectional side view of a shutoff valve according to an alternative embodiment of the invention.

FIG. 6 shows an alternative embodiment with a spring biased flapper panel 40, instead of a counterweighted panel operated by gravity. A leaf spring 102 has one end connected to a fixed flange 104 of the chassis 72, and the other connected to a free end 106 of the hinge portion 84. The spring is moderately preloaded so that the panel 40 is slightly biased against the conduit when in the closed position, and is more strongly biased toward the closed position when in an open position. Alternative spring arrangements may employ coil springs in tension between mounting points at the ends of the chassis strip and corresponding peripheral points of the panel 40. Any means of biasing the flapper to the closed position may be used, including gravity, spring energy, automated electrical actuation, fluid flow impulse, buoyancy, and the like.

In the preferred embodiment, an installation of a filter system may be made with a minimum of specialized parts needed to be stocked by the installer. Most components are standard plumbing supplies, such as the conduit pipes and the tee fitting. A filter size is selected based on system demands, and for compatibility with the standard conduit and fitting diameter. The conduit 34 is cut to the desired length with conventional tools. Only the shut-off valve assembly need be specially stocked, and a single type is used with all lengths of filters. Because the valve assembly is glued to the smooth extruded interior surface of the conduit, the quality of the end cut of the conduit is not critical, either in squareness or surface finish. The materials for the conduits and fittings may be of any conventional rigid type used for waste drainage, such as PVC, ABS, cast iron. Or other appropriate materials, with plastic being preferred.

While the disclosure is made in terms of a preferred embodiment, the invention is not intended to be so limited.

What is claimed is:

1. A wastewater filtration system comprising:
   a housing defining filter chamber and having an inlet end and an outlet;
   the housing including a length of cylindrical conduit;
   a shutoff valve assembly connected to an inlet end of the housing;
   the shutoff valve including a closure element pivotally movable between an open position and a closed position;
   the shutoff valve including biasing means biasing the valve to the closed position in the absence of a filter in the chamber;
   the closure element being positioned proximate the inlet such that the shutoff valve is responsive to the presence of a filter in the chamber to position the closure element to the open position; and
   wherein the housing is oriented substantially vertically, and wherein the closure element remains substantially vertically below the inlet when in the open position, such that a solid waste rising up toward the inlet is deflected by the closure element.

2. The system of claim 1 wherein the conduit is a conventional extruded drain pipe.

3. The system of claim 1 wherein the housing includes a conventional sanitary tee having an inlet aperture connected to the conduit, a filter access aperture opposite the inlet aperture, and a laterally extending outlet aperture.

4. The system of claim 1 wherein the closure element is connected to the housing by a hinge.

5. The system of claim 4 wherein the biasing means includes a counterweight positioned opposite a major portion of the element with respect to the hinge, such that the major portion is biased upward.

6. The system of claim 1 wherein the biasing means includes a spring.

7. The system of claim 1 wherein the inlet is an open end of the conduit, and wherein the closure element is a flat plate sized and positioned to cover the inlet when in the closed position.

8. The system of claim 1 wherein the conduit is oriented substantially vertically, and wherein the closure element remains substantially vertically below the inlet when in the open position, such that a solid waste rising up toward the inlet is deflected by the closure element.

9. The system of claim 1 wherein the shutoff valve assembly includes a fixed portion connected to an interior wall surface of the conduit, proximate the inlet.

10. A wastewater filtration system comprising:
   a housing defining filter chamber and having an inlet end and an outlet;
   a shutoff valve assembly connected to an inlet end of the housing;
   the shutoff valve including a closure element pivotable between an open position and a closed position;
   the shutoff valve including biasing means biasing the valve to the closed position in the absence of a filter in the chamber;
   the closure element being positioned proximate the inlet such that the shutoff valve is responsive to the presence of a filter in the chamber to position the closure element to the open position; and
   wherein the housing is oriented substantially vertically and wherein the closure element remains substantially vertically below the inlet when in the open position, such that a solid waste rising up toward the inlet is deflected by the closure element.

11. The system of claim 10 wherein the closure element is connected to the housing at a peripheral edge of the inlet.

12. The system of claim 10 wherein the biasing means includes a counterweight positioned opposite a major portion of the element with respect to a pivot point defined by the motion of the closure element, such that the major portion is biased upward.

13. The system of claim 10 wherein the biasing means includes a spring.

14. The system of claim 10 wherein the inlet is an open end of the housing, and wherein the closure element is a flat plate sized and positioned to cover the inlet when in the closed position.

15. The system of claim 10 wherein the housing includes a length of conventional cylindrical extruded drain pipe.

16. The system of claim 10 wherein the housing includes a conventional sanitary tee having an inlet aperture connected to the conduit, a filter access aperture opposite the inlet aperture, and a laterally extending outlet aperture.

17. The system of claim 10 wherein the shutoff valve assembly includes a fixed portion connected to an interior wall surface of the conduit, proximate the inlet.

18. An inlet shutoff valve for a septic system filter housing having a downwardly-depending vertically-oriented tubular body having a lower free end defining an inlet, the valve comprising:
   a fixed portion including attachment means for connecting to the lower end of the body;
   a closure portion connected to the fixed portion and movable between a closed position in which the closure portion substantially closes the inlet, and an open position in which the closure portion is spaced apart from the inlet and
   wherein the closure portion is pivotally connected to the fixed portion.

19. The valve of claim 18 including biasing means biasing the closure portion to the closed position in the absence of a filter in the body displacing the closure portion.

20. The valve of claim 19 wherein the biasing means comprises a spring.

* * * * *